United States Patent [19]

Bond

[11] Patent Number: 5,244,566

[45] Date of Patent: Sep. 14, 1993

[54] PROCESS FOR DEABSORBING OIL FROM OIL ABSORBENT

[75] Inventor: Gordon S. Bond, Southlake, Tex.

[73] Assignee: Insight Environmental Services, Inc., Fort Worth, Tex.

[21] Appl. No.: 718,612

[22] Filed: Jun. 21, 1991

[51] Int. Cl.$^5$ .................. C10M 175/00; B01J 20/34; B01J 13/00; C11D 1/83
[52] U.S. Cl. ........................................ 208/180; 134/40; 208/305; 210/908; 210/909; 252/173; 252/174.21; 252/311; 502/5; 502/28; 585/826
[58] Field of Search ..................................... 502/28–31; 208/180; 134/40; 210/908, 909; 585/826

[56] References Cited

U.S. PATENT DOCUMENTS

| Re. 33,210 | 5/1990 | Stoufer | 134/40 |
| 3,017,342 | 1/1962 | Bulat et al. | 208/390 |
| 4,438,009 | 3/1984 | Brusky et al. | 252/143 |
| 4,533,487 | 8/1985 | Jones | 208/180 |
| 4,620,937 | 11/1986 | Dellutri | 252/90 |
| 4,931,192 | 6/1990 | Covington et al. | 210/908 |

Primary Examiner—Paul E. Konopka
Attorney, Agent, or Firm—Charles D. Gunter, Jr.

[57] ABSTRACT

A process is shown for deabsorbing oil from an oil absorbent material. A citric oil-in-water emulsion is formulated having an aqueous external phase and having a dispersed internal phase which is comprised of a distilled citric oil. The hydrocarbon contaminated material is immersed within the citric oil-in-water emulsion, whereby absorbed hydrocarbons are extracted from the oil absorbent material.

13 Claims, 1 Drawing Sheet

PROCESS FOR DEABSORBING OIL FROM OIL ABSORBENT

BACKGROUND OF THE INVENTION

1. Field of the Invention

The present invention relates generally to compositions and methods for extracting hydrocarbon oil components from contaminated stock and for deabsorbing hydrocarbon oil components from oil absorbent materials in order to recover and recycle the hydrocarbon component and in order to reuse the oil absorbent material. More specifically, the invention relates to such an extraction method and composition which utilizes a biodegradable, non-toxic citric oil component as its active ingredient.

2. Description of the Prior Art

Oil absorbent materials which are contaminated with hydrocarbon components are found in a variety of locations. Common examples include rags which are used in machine shops and industrial operations. Other commonly encountered examples are the snakes, pads and booms used in filling stations and other automotive maintenance areas and vermiculite clay pellets of the type used to absorb hydrocarbon components. Although naphtha based solvents have been used in the past to clean such oil absorbent materials, naphtha is toxic, non-biodegradable and vaporizes easily causing fire hazards and posing a possible health risk to the pulmonary system. Also, in the case of cleaning compositions using naphtha based solvent, the contaminated cleaning fluid which is used to clean the oil absorbent material must be disposed of.

Increasingly restrictive environmental regulations ban the disposal of motor oil in landfill disposal sites. In the case of vehicle oil filters, such as automobile oil filters, for example, the metal canister contains a paper filter element which becomes contaminated with hydrocarbon components during use. Ideally, the canister should be opened and cleaned and the hydrocarbon components should be extracted from the paper filter elements, prior to disposal. The extracted hydrocarbon components can be recycled for reuse. The metal canister and cleaned filter elements can be disposed of or recycled.

Other example uses of the compositions of the present invention include the extraction and separation of oil from bottom settlement and water (BS&W) constituents of the type produced as a waste byproduct in the steel industry. Separation of pure oil components from the metal oxides, steel particles, clays and waxes present in the BS&W allow the oil to be resold, as for use in alternate fuel programs.

A need thus exists for an improved method and composition for deabsorbing hydrocarbon components from oil absorbent materials.

A need also exists for a composition which will allow valuable hydrocarbon components to be extracted from otherwise contaminated stock in a form pure enough for resale in alternate fuel programs.

A need exists for such a method which is simple and economical to implement and which uses a non-toxic, biodegradable active ingredient.

A need also exists for such an extraction composition which would not be contaminated during use and which could be recirculated for reuse within the extraction process.

SUMMARY OF THE INVENTION

In the present process for deabsorbing oil from an oil absorbent material contaminated with absorbed hydrocarbons, a citric oil-in-water emulsion is formed having an aqueous external phase and having a dispersed internal phase comprised of a distilled citric oil. The internal phase is present in the range from about 1 to 10% by volume based on the total volume of the emulsion. The hydrocarbon contaminated material is contacted with the citric oil-in-water emulsion thus formulated by immersing the hydrocarbon contaminated material within the oil-in-water emulsion, whereby the absorbed hydrocarbons are extracted from the oil absorbent material into the emulsion. The oil absorbent material is then removed from the emulsion containing the extracted hydrocarbons. The emulsion is allowed to stand, whereby the emulsion separates into at least a top, hydrocarbon layer and a bottom, emulsion layer. The top, hydrocarbon layer can then be separated and recycled. The emulsion layer can be recirculated and reused in the process.

Preferably, the distilled citric oil is distilled D-limonene The emulsion can be further stabilized by incorporating a non-ionic surfactant into the formulation. A preferred non-ionic surfactant is a nonylphenol polyethylene glycol ether. Most preferably, the citric oil-in-water emulsion is formulated by combining approximately 80% by volume distilled D-limonene with 20% by volume surfactant, the combined distilled D-limonene and surfactant then being combined with water to form an aqueous emulsion with the D-limonene/surfactant being present in the range from about 1 to 10% by volume, based on the total volume of the emulsion. The pH of the aqueous emulsion can also be adjusted within the range from about 9.0 to 10.5 to further stabilize the emulsion.

In the case of contaminated oil filter components, the hydrocarbon contaminated filter element is contacted with the citric oil-in-water emulsion by immersing the filter elements within the emulsion. The emulsion containing the hydrocarbon contaminated materials is agitated at an agitation station, whereby the hydrocarbons are extracted from the oil absorbent materials into the agitated emulsion. The agitated emulsion is circulated to a separating station where the agitated emulsion is allowed to stand and separate into a top, hydrocarbon layer, a middle layer containing components of the emulsion, and a bottom, waste layer. The top, hydrocarbon layer is separated off for recycling. The middle layer containing the components of the emulsion is recirculated to the immersion station and the bottom, waste layer is separated off and passed to a waste holding tank. The agitating station can comprise an industrial washer with hot water being supplied from a water heater to the washer, along with the hydrocarbon contaminated material and citric oil-in-water emulsion.

In the case of BS&W wastes, contact with the composition of the invention causes a pure oil layer to separate above a middle layer containing components of the emulsion and a bottom, waste layer containing metal oxides, clays, waxes and other contaminants.

Additional objects, features and advantages will be apparent in the written description which follows.

DETAILED DESCRIPTION OF THE INVENTION

Figure 1:
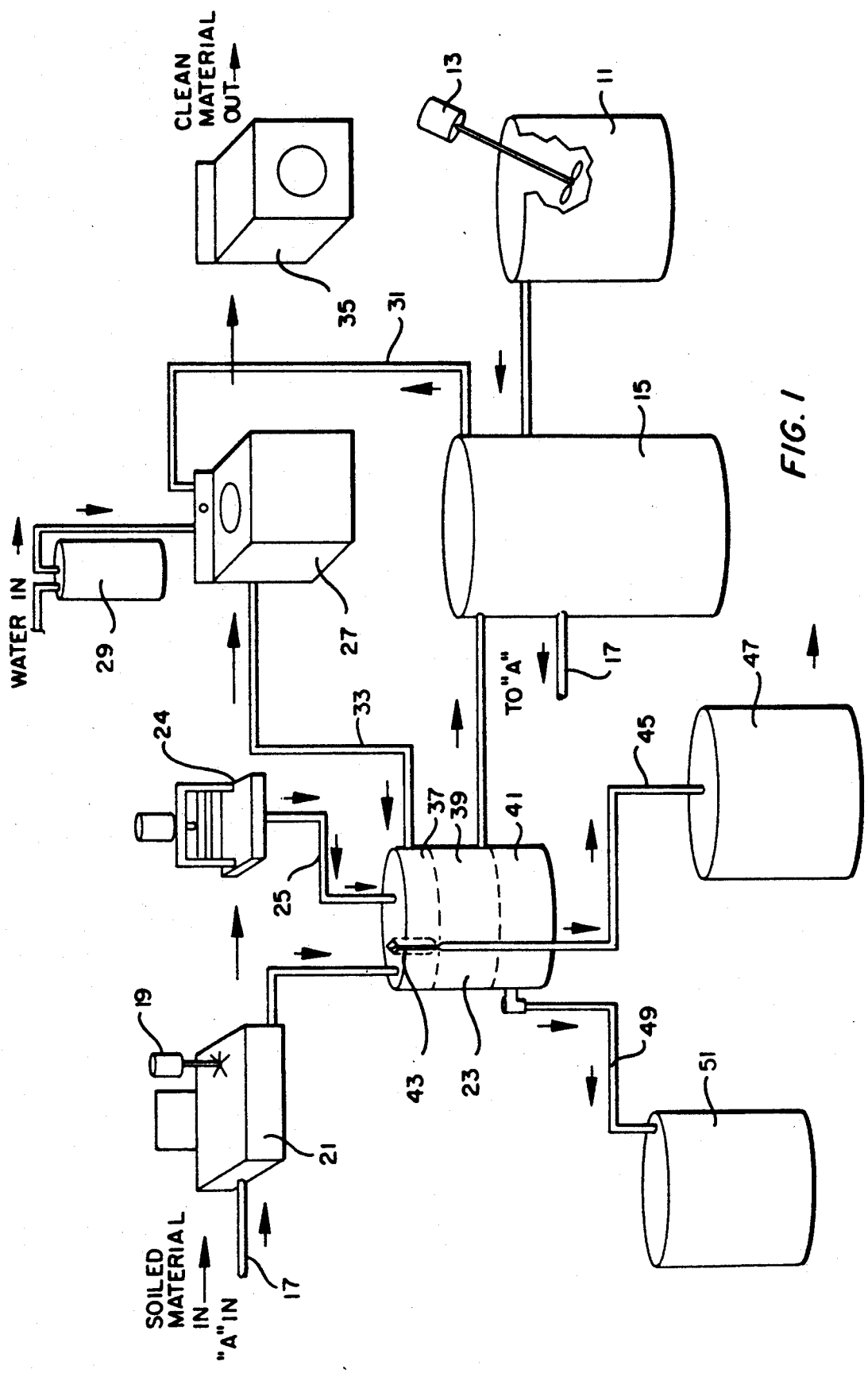
FIG. 1 is a simplified, schematic view which illustrates the steps in the process of the invention.

In the process for deabsorbing oil from an oil absorbent material of the invention, a citric oil-in-water emulsion is first formulated having an aqueous external phase and having a dispersed or internal phase which is comprised of a distilled citric oil. The preferred distilled citric oil is D-limonene which is a citrus stripper oil obtained by distilling the oils of lemons, limes, oranges and other citrus fruits. It is known chemically as 4-isopropenyl 1-methylcyclohexene and has a boiling point of approximately 325° F. a specific gravity of 0.8393 and is a clear water-white liquid having a mild orange odor. It is commercially available from Florida Chemical Company, Inc. of Lake Alfred, Fla. as "D-limonene."

In order to form a stable emulsion, a surfactant is generally required The surfactant can be any of those generally recognized in the art which are utilized to emulsify oil-in-water. Preferred classes of non-ionic surfactants include the ethoxylated nonylphenols, such as the Surfonic N Series available from Jefferson Chemical, the ethoxylated octylphenols, including the Triton X Series available from Rohm & Haas, the ethoxylated secondary alcohols such as the Tergitol Series available from Union Carbide, the ethoxylated primary alcohol series, such as the Neodols available from Shell Chemical, the polymeric ethylene oxides, such as the Pluronics available from DASF Wyandott, and the ethylene oxide propylene oxide block copolymers, such as the Plurafacs available from DASF Wyandott The preferred surfactant is a blend of a nonylphenol polyethylene glycol ether commercially available from Union Carbide as the Tergitol non-ionic surfactant NP-6 and the nonylphenol polyethylene glycol ether available from Union Carbide as the Tergitol nonionic surfactant NP-9. These surfactants have excellent oil and water dispersability and produce stable oil-in-water emulsions.

Most preferably, a blend of approximately 80% by volume D-limonene with 20% by volume of a blend of 60% Tergitol NP-6 and 40% Tergitol NP-9 are formulated. This formulation of active ingredient is then utilized in a water external phase at less than 20% by volume concentration, preferably at a concentration within the range from about 1 to 10% by volume, most preferably about 5% by volume, based on the total volume of emulsion. As a result, water is present in the formulated emulsions of the invention in the range from about 80 to 99% by volume, most preferably about 90 to 95% by volume.

It is also preferred that the pH of the emulsions so formulated be adjusted within the range from about 9.0 to 10.5 to further stabilize the emulsion. By maintaining the water concentration in the range from about 90 to 95% by volume, a liquid emulsion is maintained Increasing the D-limonene concentration above about 10% by volume initiates gelling of the formulation, which is undesirable for the purposes of the present invention.

A variety of hydrocarbon contaminated oil absorbent materials can be treated with the process of the invention. Such contaminated articles and materials can include, for example, oily rags and cloths, snakes, booms and pads of the type utilized to contain oil spills in industrial and maintenance work places, filter element components of vehicle oil filters, vermiculite clay pellets and the like. Although the remaining discussion of the process of the invention will be directed primarily toward the cleaning of hydrocarbon contaminated paper and fabric articles, it will be appreciated by those skilled in the art that the process has wide application to a variety of other contaminated materials.

FIG. 1 is a schematic illustration of a process for extracting absorbed hydrocarbons from oily cloths, rags, pads, snakes or booms of the type which might be used in an automotive garage. The citric oil-in-water emulsion is formulated in a 250 gallon mixing tank 11 by combining D-limonene and a surfactant with water (preferably deionized or softened water), the D-limonene being added in a concentration of about 1 to 10% by volume based on the total volume of emulsion formulated. A simple agitator 13 is used to mix the stable emulsion The emulsion so formulated is then pumped to a chemical holding tank 15 which in this case holds approximately 1,000 gallons. The holding tank 15 has an outlet line 17 which is routed to a 300 gallon pre-soak tank 19 adapted to receive the hydrocarbon contaminated oil absorbent materials which are to be treated by the process of the invention. The pre-soak tank is open to the atmosphere and includes a blade or air agitator 21.

The liquid formulation is circulated from the pre-soak tank 21 to a 1,000 gallon separation tank 23. The pre-soaked oil absorbent materials are passed through a press 24 with the liquid component being circulated through a conduit 25 to the separation tank 23. The damp oil absorbent material is passed to an agitation station, such as the 65 pound industrial washer 27. Hot water from a water heater 29 is routed to the washer 27 and a conduit 31 supplies the remaining components of the emulsion to the washer so that the emulsion is formulated with the proper ratio of water to D-limonene/-surfactant. Agitation of the hydrocarbon contaminated material with the emulsion so produced at the agitation station 27 causes the hydrocarbons to be extracted from the oil absorbent material into the agitated emulsion. The agitated emulsion is circulated, at the end of the wash cycle, to the separation tank 23 where the agitated emulsion is allowed to stand and separate into at least a top, hydrocarbon layer and a bottom, emulsion layer. The cleaned oil absorbent materials are passed to a drying station, such as the 50 pound industrial dryer 35 and from the dryer to packing and shipping stations.

While the agitating station has been described in terms of an industrial washer, those skilled in the art will appreciate that ultrasonic/ultravibration units are commercially available which could be used as well.

Preferably, the separation tank 23 allows the emulsion and extracted hydrocarbons to separate into a top, hydrocarbon layer 37, a middle layer 39 containing emulsion components and a bottom , waste layer 41. The top, hydrocarbon layer is skimmed off by means of skimmer 43 (16 gallons/hour) and circulated through a conduit 45 to a 1,000 gallon oil holding tank 47. Preferably, the oil component which is stored in the tank 47 goes to a recycler for reuse in other industries or for alternate fuel programs. The bottom, waste layer in the separation tank 23 is passed through a conduit 49 to a 300 gallon waste holding tank 51. The waste components can include, for example, sludge, iron oxide, clays, heavy metals, and the like. The emulsion components present in the separation tank 23 are decanted and recirculated through a conduit 53 to the chemical holding tank 15 for reuse in the process.

In the case of BS&W wastes, the tarry waste material can be mixed with the composition of the invention in a mixing tank, causing the mixture to separate into three layers as previously described. The top layer will be relatively pure oil of a quality suitable for resale and reuse as an alternate fuel. The middle layer contains components of the emulsion which can be re-used. The bottom layer contains waste metal oxides, clays, waxes, steel particles and sludge.

An invention has been provided with several advantages. The process of the invention provides a means for simply and economically separating absorbed hydrocarbons from oil absorbent materials in order that the materials can be cleaned and reused. The active ingredient of the formulations of the invention, D-limonene, is non-toxic and biodegradable. The emulsions formulated with D-limonene utilize a water external phase and are not contaminated during the oil extraction process. The emulsion components can be recirculated and reused in the process and do not pose a disposal problem. The hydrocarbon components which are separated during the extraction process can be recovered and reused. The D-limonene component has a flash point of approximately 114° F., but when mixed with water in the aqueous phase has no flash point and does not pose a fire hazard or a breathing hazard. The method and composition of the invention can also be used to extract hydrocarbon oil components from contaminated stock so that the hydrocarbon oil components can be resold in alternate fuel programs.

While the invention has been shown in only one of its forms, it is not thus limited but is susceptible to various changes and modifications without departing from the spirit thereof.

What is claimed is:

1. A process for deabsorbing oil from an oil absorbent material contaminated with absorbed hydrocarbons, comprising the steps of:
   formulating a citric oil-in-water emulsion having an aqueous external phase and having a dispersed internal phase comprised of a distilled citric oil, the internal phase being present in the range from about 1 to 10% by volume of the total emulsion, and stabilizing said emulsion by adjusting the pH within the range from about 9.0 to about 10.5;
   contacting the hydrocarbon contaminated material with the citric oil-in-water emulsion thus formulated by immersing, the hydrocarbon contaminated material within the citric oil-in-water emulsion, whereby the absorbed hydrocarbons are extracted from the oil absorbent material into the emulsion;
   removing the oil absorbent material from the emulsion containing the extracted hydrocarbons;
   allowing the emulsion to stand, whereby the emulsion separates into at least a top, hydrocarbon layer and a bottom, emulsion layer; and
   separating off the top, hydrocarbon layer.

2. The process of claim 1, wherein the stabilized, distilled citric oil is distilled D-limonene 3. The process of claim 2, wherein the citric oil-in-water emulsion has added thereto a non-ionic surfactant which is a nonylphenol polyethylene glycol ether.

4. The process of claim 3, wherein the citric oil-in-water emulsion is formulated by combining approximately 80% by volume distilled D-limonene with 20% by volume surfactant, the combined distilled D-limonene and surfactant being present in the aqueous emulsion in the range from about 1 to 10% by volume, based on the total volume of emulsion.

5. A process for treating an absorbent material contaminated with absorbed hydrocarbons, comprising the steps of:
   formulating a citric oil-in-water emulsion having an aqueous external phase and having a dispersed internal phase comprised of a distilled citric oil, the internal phase being present in the range from about 1 to 10% by volume of the total emulsion, and stabilizing said emulsion by adjusting the pH within the range from about 9.0 to about 10.5;
   contacting the hydrocarbon contaminated material with the citric oil-in-water emulsion thus formulated by immersing the hydrocarbon contaminated material within the citric oil-in-water emulsion at an agitation station;
   agitating the emulsion containing the hydrocarbon contaminated material at the agitation station, whereby the hydrocarbons are extracted from the absorbent material into the agitated emulsion;
   circulating the agitated emulsion containing the extracted hydrocarbons to a separating station where the agitated emulsion is allowed to stand and separate into at least a top, hydrocarbon layer and a bottom, emulsion layer; and
   separating off the top, hydrocarbon layer and recirculating the bottom, emulsion layer to the agitation station.

6. The process of claim 5, wherein the stabilized, distilled citric oil is distilled D-limonene.

7. The process of claim 6, wherein the citric oil-in-water emulsion has added thereto a non-ionic surfactant which is a nonylphenol polyethylene glycol ether.

8. The process of claim 7, wherein the citric oil-in-water emultion is formulated by combining approximately 80% by volume distilled D-limonene with 20% by volume surfactant, the combined distilled D-limonene and surfactant being present in the aqueous emulsion in the range from about 1 to 10% by volume, based on the total volume of emulsion.

9. The process of claim 5, wherein the oil absorbent material is the used paper filter element of a vehicle oil filter.

10. The process of claim 5, wherein the oil absorbent material is a fabric material which is contaminated with absorbed hydrocarbons.

11. A process for deabsorbing oil from an oil absorbent material contaminated with absorbed hydrocarbons, comprising the steps of:
    formulating a citric oil-in-water emulsion having an aqueous external phase and having a dispersed internal phase comprised of distilled D-limonene, the internal phase being present in the range from about 1 to 10% by volume of the total emulsion, and stabilizing said emulsion by adjusting the pH within the range from about 9.0 to about 10.5;
    contacting the hydrocarbon contaminated material with the citric oil-in-water emulsion thus formulated by immersing the hydrocarbon contaminated material within the citric oil-in-water emulsion at an agitation station;
    agitating the emulsion containing the hydrocarbon contaminated material at the agitation station, whereby the hydrocarbons are extracted from the absorbent material into the agitated emulsion;
    circulating the agitated emulsion containing the extracted hydrocarbons to a separating station where the agitated emulsion is allowed to stand and separate into at least a top, hydrocarbon layer, a middle layer containing components of the emulsion, and a bottom, waste layer.

separating off the top, hydrocarbon layer and recycling;

recirculating the middle layer containing the components of the emulsion to the agitation station; and separating off the bottom, waste layer and passing it to a waste holding tank.

12. The process of claim 11, wherein the agitating station is an industrial washer and wherein hot water is supplied from a water heater to the washer, along with the hydrocarbon contaminated material and citric oil-in-water emulsion.

13. The process of claim 11, wherein the agitating station is an ultrasonic/ultravibration device.

* * * * *